US012627172B2

(12) United States Patent (10) Patent No.: US 12,627,172 B2
Takahashi et al. (45) Date of Patent: May 12, 2026

(54) WIRELESS POWER SUPPLY APPARATUS

(71) Applicant: DENSO CORPORATION, Kariya-city (JP)

(72) Inventors: Masaya Takahashi, Kariya-city (JP); Mitsuru Shibanuma, Kariya-city (JP); Yusei Nakayashiki, Kariya-city (JP); Eisuke Takahashi, Kariya-city (JP); Kazuyoshi Obayashi, Kariya-city (JP); Nobuhisa Yamaguchi, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/931,818

(22) Filed: Oct. 30, 2024

(65) Prior Publication Data

US 2025/0055323 A1 Feb. 13, 2025

Related U.S. Application Data

(63) Continuation of application No. PCT/JP2023/017362, filed on May 9, 2023.

(30) Foreign Application Priority Data

May 18, 2022 (JP) ................................. 2022-081643

(51) Int. Cl.
  *H02J 50/12* (2016.01)
  *B60L 53/122* (2019.01)
  *H01F 38/14* (2006.01)
  *H02J 50/40* (2016.01)

(52) U.S. Cl.
  CPC ............ *H02J 50/12* (2016.02); *B60L 53/122* (2019.02); *H02J 50/402* (2020.01); *B60L 2210/30* (2013.01); *H01F 38/14* (2013.01)

(58) Field of Classification Search
  CPC .......... H02J 50/12; H02J 50/402; H02J 50/90; H02J 50/80; H02J 2310/48; H02J 7/00; H02J 50/10; H02J 50/40; B60L 53/122; B60L 2210/30; B60L 53/126; H01F 38/14
  See application file for complete search history.

(56) References Cited

U.S. PATENT DOCUMENTS

| | | | |
|---|---|---|---|
| 9,438,068 B2 * | 9/2016 | Wakabayashi | H02J 50/80 |
| 2012/0161530 A1 * | 6/2012 | Urano | H02J 50/90 |
| | | | 307/104 |
| 2017/0263377 A1 * | 9/2017 | Kessoku | H01F 38/14 |
| 2022/0149664 A1 * | 5/2022 | Takahashi | H02J 50/40 |

FOREIGN PATENT DOCUMENTS

| | | | |
|---|---|---|---|
| JP | 2012-034445 A | | 2/2012 |
| JP | 2015073380 A | * | 4/2015 |
| JP | 2019-071719 A | | 5/2019 |

* cited by examiner

*Primary Examiner* — Rexford N Barnie
*Assistant Examiner* — Michael J Warmflash
(74) *Attorney, Agent, or Firm* — Oliff PLC

(57) ABSTRACT

A wireless power supply apparatus that supplies power to a reception apparatus in a wireless manner, the wireless power supply apparatus including: a power source apparatus that outputs an AC power, a transmission coil electrically connected to the power source apparatus; and a setting circuit interposed between the power source apparatus and the transmission coil, setting the transmission coil to be in either a power feeding state or a standby state, wherein the setting circuit is provided separately from the power source apparatus.

7 Claims, 11 Drawing Sheets

| OPPOSING (OPPOSED STATE) | | NOT OPPOSING (NON-OPPOSED STATE) |
|---|---|---|
| (a) | (b) | (c) |

WIRELESS POWER SUPPLY APPARATUS

CROSS-REFERENCE OF RELATED APPLICATIONS

This application is the U.S. bypass application of International Application No. PCT/JP2023/017362 filed on May 9, 2023, which designated the U.S. and claims priority to Japanese Patent Application 2022-81643 filed on May 18, 2022, and the contents of both of these are incorporated herein by reference.

BACKGROUND

Technical Field

The present disclosure relates to wireless power supply apparatus.

Description of the Related Art

A power supply system is known in which a transmission coil supplied with power from a high frequency power source is provided and a reception coil mounted on a mobile body for example is supplied with a power in a wireless manner. According to the power supply system disclosed in the above-mentioned power supply system, a current control element is disposed, in order to suppress a current flowing through the transmission coil in a standby-state, in which the impedance increases when a current flowing between the high frequency power source and the transmission coil is less than a threshold value.

SUMMARY

The present disclosure can be embodied in the following manners.

According to one aspect of the present disclosure, a wireless power supply apparatus that supplies power to a reception apparatus in a wireless manner is provided.

The wireless power supply apparatus is provided with a power source apparatus that outputs an AC power; a transmission coil electrically connected to the power source apparatus; and a setting circuit interposed between the power source apparatus and the transmission coil, setting the transmission coil to be in either a power feeding state or a standby state, wherein the setting circuit is provided separately from the power source apparatus.

BRIEF DESCRIPTION OF THE DRAWINGS

The above-described objects and other objects, features and advantages of the present disclosure will be clarified further by the following detailed description with reference to the accompanying drawings. The drawings are:

FIG. 1 is a diagram showing an overall configuration of a wireless power supply system;

FIG. 3 is a diagram showing an opposed state and a non-opposed state between a transmission coil and a reception coil;

DETAILED DESCRIPTION OF PREFERRED EMBODIMENTS

Figure 2:
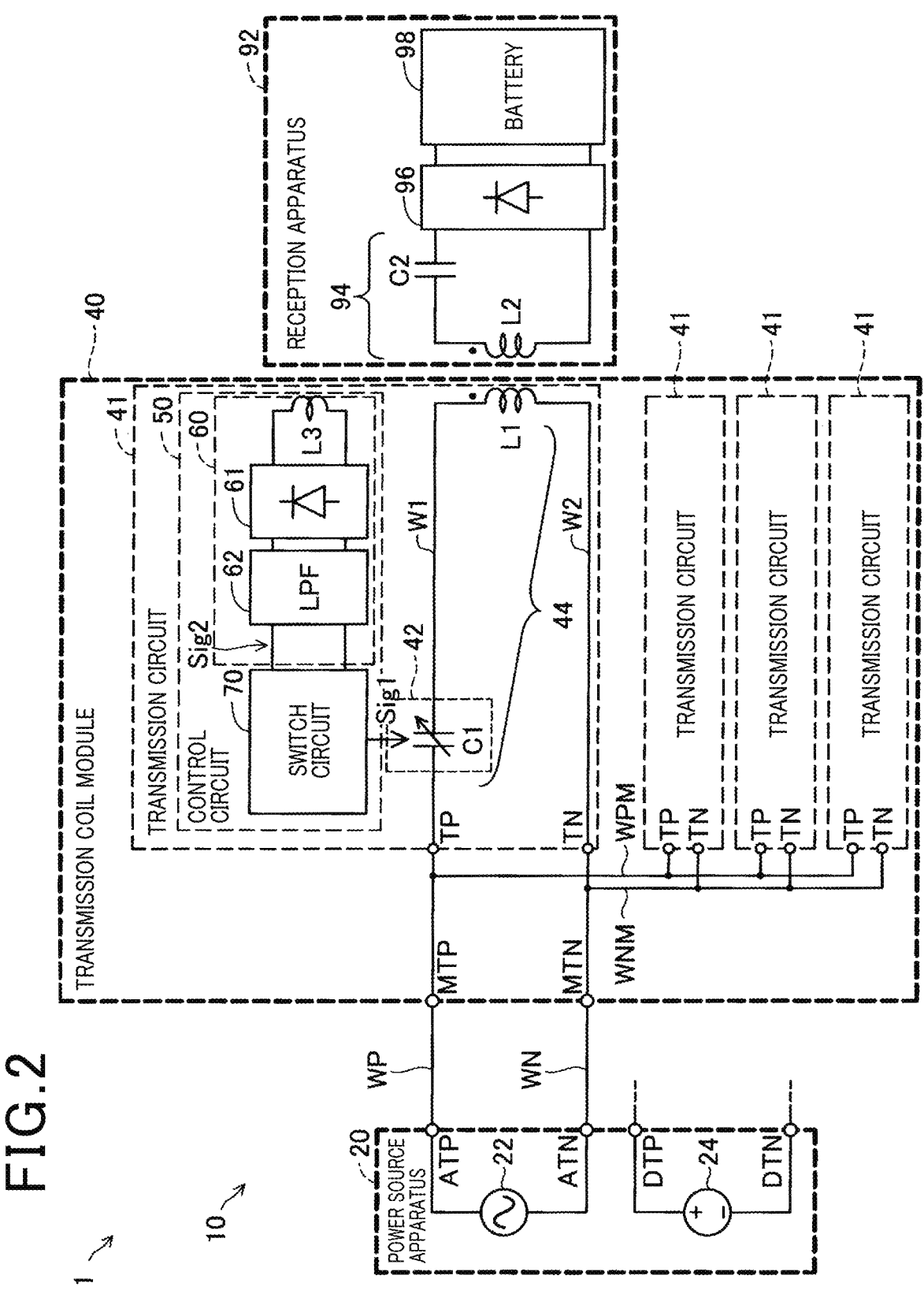
FIG. 2 is a diagram showing a circuit configuration of the wireless power supply system.

A power supply system is known. For example, JP-A-2019-71719 discloses a power supply system in which a transmission coil supplied with power from a high frequency power source is provided and a reception coil mounted on a mobile body for example is supplied with a power in a wireless manner. According to the power supply system disclosed in the above-mentioned patent literature, a current control element is disposed, in order to suppress a current flowing through the transmission coil in a standby-state, in which the impedance increases when a current flowing between the high frequency power source and the transmission coil is less than a threshold value.

However, an arrangement of a circuit to suppress the current flowing through the transmission coil in a standby-state is not sufficiently considered. Hence, it needs to improve the arrangement of the circuit.

A. First Embodiment

Figure 1:
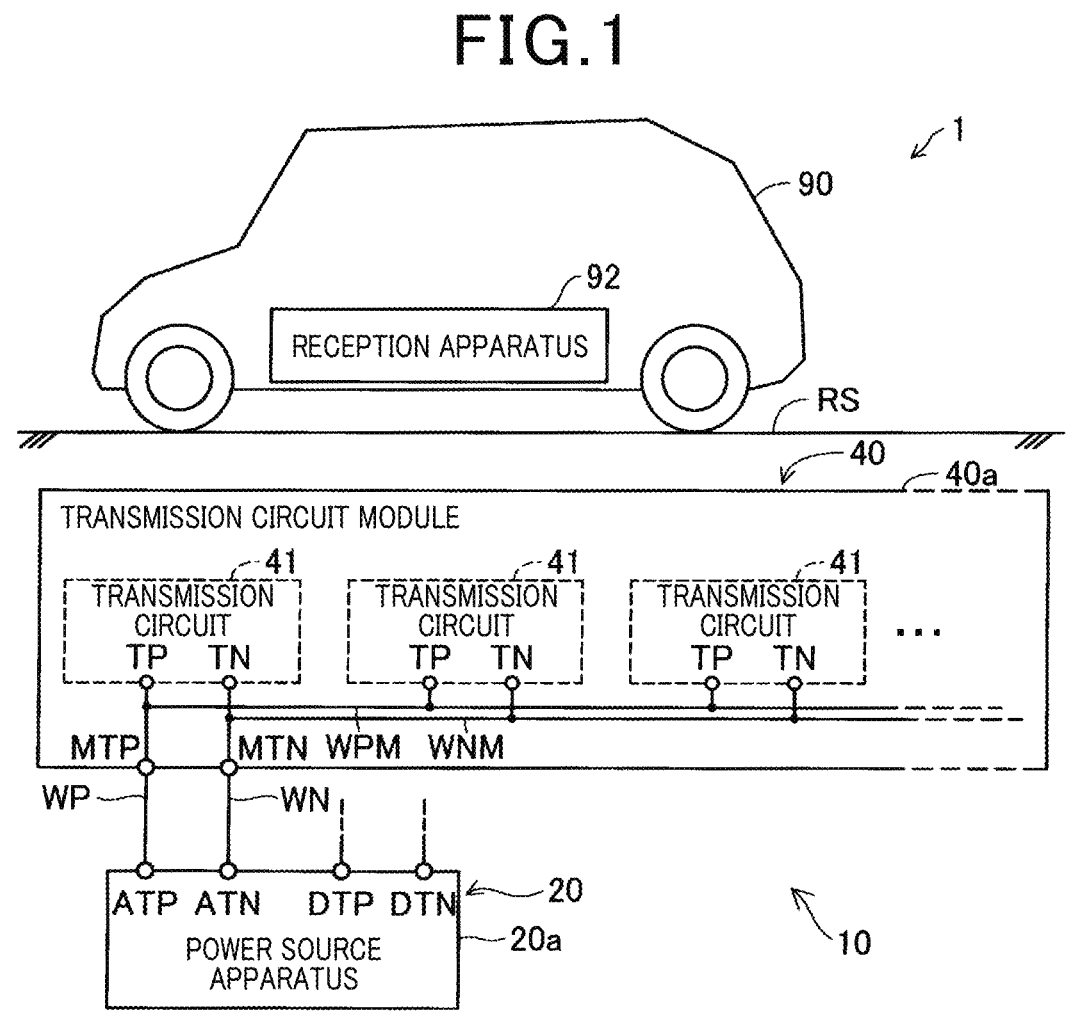

As shown in FIG. 1, a wireless power supply system 1 is provided with a wireless power supply apparatus 10, a power reception apparatus 92 mounted on a vehicle 90. The wireless power supply apparatus 10 supplies power to the power reception apparatus 92 in a wireless manner. The vehicle 90 may be, for example, an electric vehicle or a hybrid vehicle to which a drive motor is mounted. The wireless power supply apparatus 10 includes a transmission coil module 40 provided on a road RS as a passage where the vehicle 90 travels.

As described later, the wireless power supply apparatus 10 is provided with a transmission coil module 40 having a transmission coil L1 and a power source apparatus 20 for supplying power to the transmission coil L1. According to the present configuration, a power source wiring is required for supplying power to the transmission coil module 40 from the power source apparatus 20. Hence, when installing the wireless power source apparatus 10, the power source wiring is necessary in addition to installing the power source apparatus 20 and the transmission coil module 40. According to the present embodiment, a workload is reduced for installing the wireless power source apparatus 10 using various ideas.

As shown in FIG. 2, the power source apparatus 20 is provided with an AC power source 22, a DC power source 24, a first AC output terminal ATP, a second AC output terminal ATN, a first DC output terminal DTP and a second DC output terminal DTN. The AC power source 22 and the DC power source 24 are accommodated in a power source housing 20a shown in FIG. 1. The first AC output terminal ATP, the second AC output terminal ATN, the first DC output terminal DTP and the second DC output terminal DTN are provided exposed outside the power source housing 20a. The AC power source 22 converts a power supplied from an external power source (not shown) into an AC power having an object high-frequency-range operating frequency, and outputs the converted AC power to the first AC output terminal ATP and the second AC output terminal ATN. The DC power source 24 converts a power supplied from an external power source (not shown) into an DC power having an object operation voltage and outputs the converted DC power to the first DC output terminal DTP and the second DC output terminal DTN. The DC power outputted from the DC power source 24 is supplied to a control circuit 50 (described later) included in the transmission coil module 40 via a wiring which is not shown.

As shown in FIG. 1, according to the present embodiment, the transmission coil module 40 is provided with a plurality of transmission circuits 41, a first coil terminal MTP and a second coil terminal MTN as external connection terminals. The plurality of transmission circuits 41 are accommodated in a coil housing 40a. The first coil terminal MTP, and the second coil terminal MTN are provided exposing from the coil housing 40a. The first AC output terminal ATP and the first coil terminal MTP are electrically connected by a first power source wiring WP. The second AC output terminal ATN and the second coil terminal MTN are electrically connected by a second power source wiring WN. The respective transmission circuits 41 are connected to the first coil terminal MTP and the second coil terminal MTN respectively by a first internal wiring WPM and a second internal wiring WNM in the coil housing 40a.

As shown in FIG. 2, the transmission circuit 41 includes a transmission coil L1, a setting circuit 42, a control circuit 50, a first transmission circuit terminal TP and a second transmission circuit terminal TN. According to the present embodiment, the setting circuit 42 is configured as a first circuit including a variable capacitance capacitor C1. The variable capacitance capacitor C1 has a function of causing a transmission resonant circuit 44 (described later) to be in a resonant state with an operating frequency and causing the transmission resonant circuit 44 to be in a non-resonant state with an operating frequency. The transmission coil L1 is electrically connected to the power source apparatus 20. The setting circuit 42 is interposed between the power source apparatus 20 and the transmission coil L1. Specifically, the variable capacitance capacitor C1 and the transmission coil L1 are connected in series in this order between the first transmission circuit terminal TP and the second transmission circuit terminal TN. The variable capacitance capacitor C1 and the transmission coil L1 constitute a series resonant circuit. The resonant circuit configured of the variable capacitance capacitor C1 and the transmission coil L1 is also referred to as a transmission resonant circuit 44. The variable capacitance capacitor C1 is also referred to as a resonant capacitor. The plurality of transmission coils L1 included in the transmission coil module 40 are connected in parallel to the AC power source 22.

The transmission coil L1 can be accomplished as a configuration in which a Litz wire is wound around a center axis line of the coil, or a configuration in which a printed wiring is formed around a coil center axis on a printed circuit board to be in a C-shape or a spiral shape, or a configuration in which a stacked printed circuit board each including a printed wiring formed around a coil center axis in a C-shape or a spiral shape and adjacent printed circuit board wirings are mutually connected to form a spiral-shaped wiring.

The setting circuit 42 sets the transmission coil L1 to be in either a power feeding state or a standby state. The setting circuit 42 is configured separately from the power source apparatus. Thus, as will be described later, a workload is reduced for installing the wireless power source apparatus 10. The setting circuit 42 is provided on a wiring that electrically connects between the first coil terminal MTP as an external connection terminal and the transmission coil L1. According to the present embodiment, the variable capacitance capacitor C1 is configured such that the capacitance value is capable of being switched between a first capacitance and a second capacitance which is smaller than the first capacitance. Then, the capacitance value of the variable capacitance capacitor C1 is switched to be either the first capacitance or the second capacitance in accordance with a switch signal Sig1 outputted from the control circuit 50. In the case where the transmission coil L1 and a reception coil L2 are magnetically coupled and the capacitance of the variable capacitance capacitor C1 is the first capacitance, the transmission resonant circuit 44 is in a resonant state at the operating frequency. In contrast, when the variable capacitance capacitor C1 is the second capacitance, the resonant frequency of the transmission resonant circuit 44 is deviated from the operating frequency. Hence, the transmission circuit 44 is in the non-resonant state at the operating frequency.

The control circuit 50 outputs a switch signal Sig1 to the variable capacitance capacitor C1. The control circuit 50 includes a detection circuit 60 and a switch circuit 70. The detection circuit 60 detects, as described later, physical quantity which varies depending on a distance between the transmission coil L1 and the reception coil L2, and outputs the detection signal Sig2 to the switch circuit 70. The detection circuit 60 includes a detection coil L3, a rectifier circuit 61 and a low pass filter 62. The detection coil L3 is disposed to be capable of magnetically coupling with the transmission coil L1. When magnetic flux density passing through the detection coil L3 changes, an induced current flows through the detection coil L3. The induced current flowing through the detection coil L3 is rectified by the rectifier circuit 61, and high frequency component thereof is eliminated by the low pass filter 52, and the rectified induced current where the high frequency component is eliminated is outputted to the switch circuit 70 as the detection voltage. The detection voltage is also referred to as detection signal Sig2.

The switch circuit 70 compares the detection voltage outputted from the low pass filter 52 with a reference voltage, and outputs the switch signal Sig1 when the voltage compared with the reference voltage is higher than or equal to the reference voltage. The switch circuit 70 is implemented by a microprocessor, a comparator and the like.

The reception apparatus 92 includes a reception coil L2, a reception capacitor C2, a rectifier circuit 96 and a battery 98. A resonant circuit is configured of the reception coil L2 and the reception capacitor C2. The resonant circuit configured of the reception coil L2 and the reception capacitor C2 is also referred to as a reception resonant circuit 94. The resonant frequencies of the transmission resonant circuit 44 and the reception resonant circuit 94 are set to be substantially the same in the case where the transmission coil L1 and the reception coil L2 are magnetically coupled. Thus, with a magnetic resonant between the transmission coil L1 and the reception coil L2, a wireless power supply operation can be performed.

The rectifier circuit 96 converts the AC power outputted from the reception resonant circuit 94 into a DC power, and supplies the converted DC power to the battery 98. According to the present embodiment, the battery 98 is a secondary battery that outputs a DC power utilized for driving a drive motor as a driving source of a vehicle 90.

As shown in FIG. 1, the transmission circuits 41 are arranged along a direction where the road RS extends. According to a wireless power supply system 1 of the present embodiment, the reception apparatus 92 of the vehicle 90 travelling on the road RS is configured to be power-supplied from the nearest transmission circuit 41. Specifically, the transmission resonant circuit 44 is configured to be in a resonant state when the reception coil L2 is present in the vicinity of the transmission coil L1. In the case where the reception coil L2 is not present in the vicinity of the transmission coil L1, the transmission resonant circuit 44 is in a non-resonant state.

With reference to FIG. 2, when explaining in more detail, since a degree of magnetic coupling between the transmission coil L1 and the reception varies depending on a distance between the transmission coil L1 and the reception coil L2, the inductance of the transmission coil L1 varies. Specifically, in the case where the transmission coil L1 and the reception coil L2 are arranged to have the same polarity, the shorter the distance between the transmission coil L1 and the reception coil L2, the higher the degree of magnetic coupling. Hence, a mutual inductance becomes larger and the impedance of the transmission resonant circuit 44 becomes smaller. Accordingly, when the shorter the distance between the transmission coil L1 and the reception coil L2, the larger the current value of the current flowing through the transmission resonant circuit 44 is, whereby a magnetic flux density as a physical quantity caused by the transmission coil L1 becomes larger.

When the vehicle 90 approaches an object transmission coil L1, the object transmission coil L1 opposes the reception coil L2. The reference voltage used by the switch circuit 70 is set such that the detection voltage of the detection circuit 60 is higher than the reference voltage when the magnetic flux density of an opposed transmission coil OL1 (FIG. 3) which is a transmission coil L1 that opposes the reception coil L2 becomes larger. Hence, in the case where the magnetic flux of the opposed transmission coil OL1 is larger, the switch circuit 70 outputs the switch signal Sig1, the capacitance of the variable capacitance capacitor C1 connected to the opposed transmission coil OL1 is set to be a first capacitance. In contrast, since the magnetic flux of the non-opposed transmission coil NL1 (FIG. 3), as a transmission coil L1 not opposing the reception coil L2, does not significantly change, the detection voltage of the detection circuit 60 is lower than the reference voltage and the capacitance of the variable capacitance capacitor C1 connected to the non-opposed transmission coil NL1 is set to be a second capacitance. Therefore, the transmission resonant circuit 44 having the opposed transmission coil OL1 is in a resonant state and the transmission resonant circuit 44 having non-opposed transmission coil NL1 is in a non-resonant state. Thus, a wireless power supply operation can be performed with the transmission resonant circuit 44 having the opposed transmission coil OL1. Further, since the second capacitance is smaller than the first capacitance, an impedance of the transmission resonant circuit 44 having the non-opposed transmission coil NL1 is higher than an impedance of the transmission resonant circuit 44 having the opposed transmission coil OL1. Accordingly, current flowing through the transmission resonant circuit 44 having the non-opposed transmission coil NL1 is smaller than current flowing through the transmission resonant circuit 44 having the opposed transmission coil OL1. As a result, a power loss at the transmission resonant circuit 44 having the non-opposed transmission coil NL1 is reduced and a leakage flux at the transmission resonant circuit 44 having the non-opposed transmission coil NL can also be reduced.

As described above, the detection circuit 60 is used for determining whether the transmission coil L1 and the reception coil L2 are opposed or not. According to the present embodiment, the detection circuit 60 detects a change in the magnetic flux density caused by the transmission coil L1, thereby switching the state of the transmission coil L1 between a power feeding state and a standby state. Thus, when the reception coil L2 approaches, the state of the transmission coil L1 can be promptly switched between the power feeding state and the standby state.

A power feeding state of the transmission coil L1 is defined as a state where the transmission resonant circuit 44 is in a resonant state and a wireless power supply operation is performed for the reception apparatus 92 with a magnetic resonance between the transmission coil L1 and the reception coil L2. Further, a standby state of the transmission coil L1 is defined as a state where the wireless power supply is not performed for the reception apparatus 92 when the transmission resonant circuit is in a non-resonant state.

Figure 3:
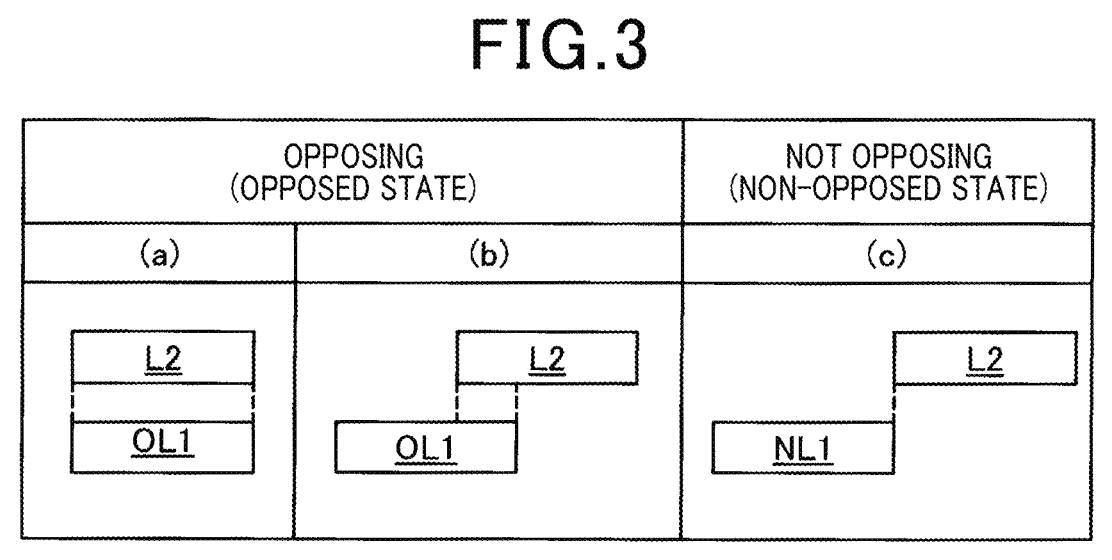

Note that, as shown in FIG. 3, a state where the transmission coil L1 and the reception coil L2 are opposed each other includes not only a state (a) where entire part of the transmission coil L1 and entire part of the reception coil L2 with respect to a direction in a coil center axis of the transmission coil L1 are opposed each other, but also a state (b) where a part of the transmission coil L1 and a part of the reception coil L2 are opposed each other. A state where the transmission coil L1 and the reception coil L2 are not opposed each other refers to a state (c) where no opposed part is present between the transmission coil L1 and the reception coil L2 with respect to the direction in the coil center axis.

As described above, as shown in FIG. 2, the transmission circuit 41 according to the present embodiment is provided with a setting unit 42, whereby wireless power supply can be performed with the opposed transmission coil OL1 and a current flowing through the non-opposed transmission NL1 can be suppressed. Further, since the setting circuit 42 is provided separately from the power source apparatus 20, in the case where another transmission coil L1 is additionally provided to be connected in parallel to the power source apparatus 20, a power source wiring used for supplying power to another transmission coil L1 can be branched from the first power source wiring WP and the second power source wiring WN. Thus, without directly drawing the power source wiring from the power source apparatus 20, another transmission coil L1 can be additionally provided, whereby a workload is reduced for installing the wireless power source apparatus 10.

Moreover, the setting circuit 42 is provided separately from the power source apparatus 20, whereby the power source wiring for supplying power to the transmission coil L1 from the power source apparatus 20 can be limited to the first power source wiring WP and the second power source wiring WN. Unlike the present embodiment, the setting circuit 42 and the power source apparatus 20 can be integrated. However, according to this configuration, a wiring W1 that connects the setting circuit 42 and the transmission coil L1 and a wiring W2 that connects the transmission coil L1 and the AC power source 22 are required for each transmission coil L1. In other words, similar to the present embodiment, in the case where a plurality of transmission coils L1 are connected in parallel to the AC power source 22, two power source wirings are required for each of the transmission coils L1 connected in parallel to the AC power source 22. Specifically, in the case where four transmission circuits 41 are present, eight power source wirings are required. In this respect, according to the present embodiment, since the setting circuit 42 is provided separately from the power source apparatus 20, two power source wirings of the first power source wiring WP and the second power source wiring WN are used, whereby power can be supplied to the plurality of transmission coils L1. Also, the terminals for the AC power can be limited to two terminals, that is, the first coil terminal MTP and the second coil terminal MTN. Thus, a workload is reduced for installing the wireless power source apparatus 10. The distance between the setting circuit 42 and the transmission coil L1 may preferably be shorter than the distance between the setting circuit 42 and the power source apparatus 20. This is because, lengths of the wiring W1 and the wiring W2 required for each of the transmission coils L1 can be shorter than the lengths of the first power source wiring WP and the second power source wiring WN.

According to the first embodiment as described above, since the setting circuit 42 is provided separately from the power source apparatus 20, a workload is reduced for installing the wireless power source apparatus 10. Further, even in a case where a plurality of transmission coils L1 are connected in parallel to the AC power source 22, since the setting circuit 42 is provided separately from the power source apparatus 20, the power source wiring drawn out from the power source apparatus 20 can be limited to the first power source wiring WP and the second power source wiring WN. Thus, a workload is reduced for installing the wireless power source apparatus 10. Further, the transmission coil module 40 includes a setting circuit 42. Thus, the transmission coil L1 and the setting circuit 42 can be treated as an integrated body, whereby a workload is reduced for installing the wireless power source apparatus 10. Also, the setting circuit 42 is configured to include a variable capacitance capacitor C1. Thus, the capacitance of the variable capacitance capacitor C1 is switched to be either the first capacitance or the second capacitance, whereby the transmission coil L1 can be set to be in either a power feeding state or a standby state. Further, the detection circuit 60 and the switch circuit 70 are arranged in the transmission coil module 40. Thus, the detection circuit 60 and the switch circuit 70 can be treated as an integrated body, whereby workload is reduced for installing the wireless power source apparatus 10.

B. Second Embodiment

Figure 4:
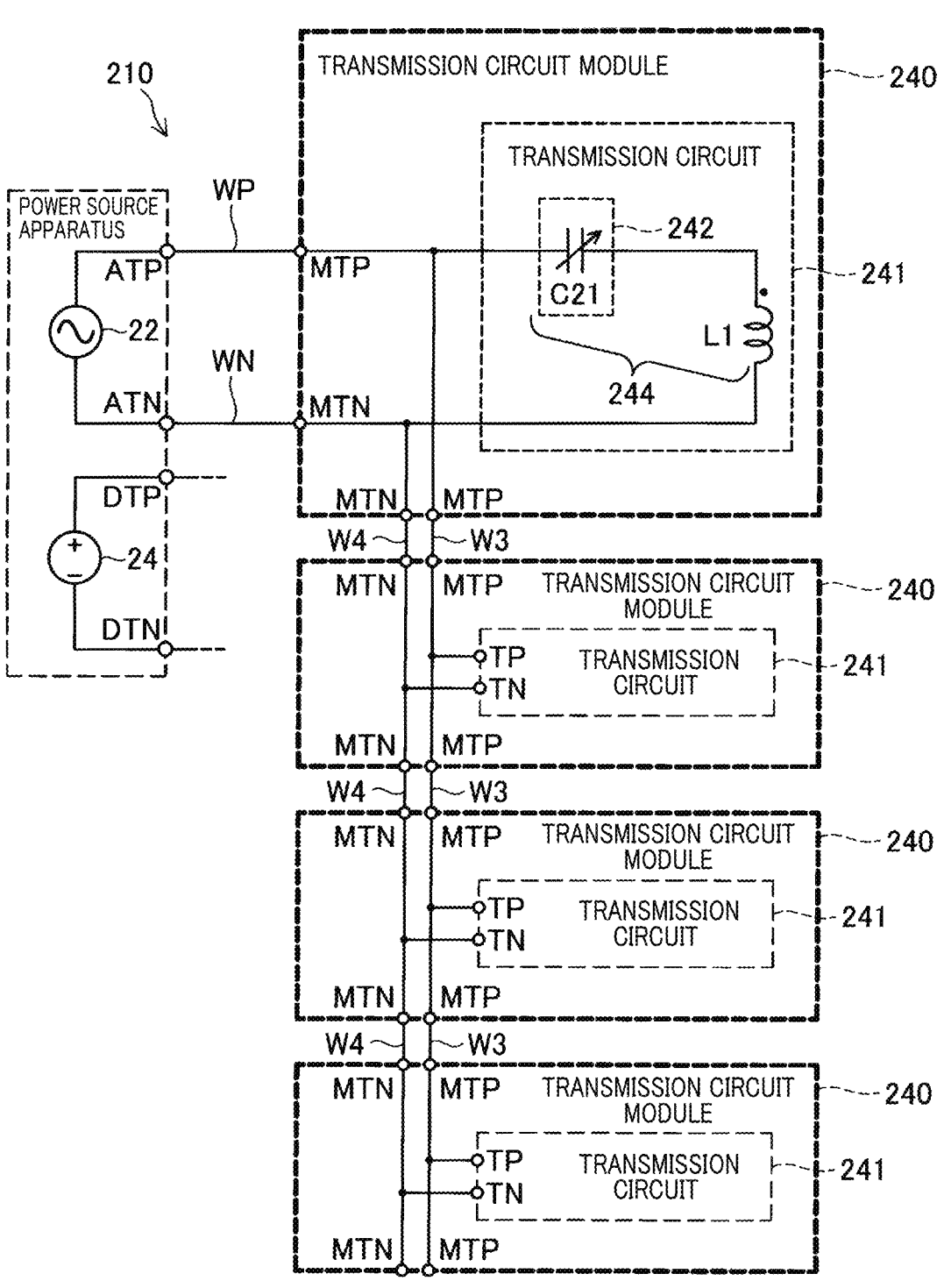
FIG. 4 is a diagram showing a circuit configuration of a wireless power supply apparatus according to a second embodiment.

A transmission coil module 240 included in a wireless power supply apparatus 210 shown in FIG. 4 differs from the transmission coil module 40 according to the first embodiment in that the number of transmission circuits 41 is different therebetween. Specifically, the transmission coil module 40 according to the present embodiment includes a plurality of transmission circuits 41, and the transmission coil module 240 according to the present embodiment includes one transmission circuit 241. The transmission circuit 241 according to the second embodiment differs from the first embodiment in that transmission circuit 241 according to the second embodiment does not include the control circuit 50 and the setting circuit 242 is configured to include a variable capacitance capacitor C21 in which the capacitance varies depending on a change in the magnetic flux. Note that configurations same as those in the first embodiment are applied with the same reference symbols and the explanation thereof will be omitted.

The transmission coil module 240 includes a transmission circuit 241, two first coil terminals MTP and two second coil terminals MTN. The two first coil terminals MTP are electrically connected in the transmission coil module 240. Similarly, two second coil terminals MTN are electrically connected in the transmission coil module 240. The first AC output terminal ATP and the first coil terminal MTP in one transmission coil module 240 are electrically connected by the first power source wiring WP. The second AC output terminal ATN and the second coil terminal MTN in one transmission coil module 240 are electrically connected by the second power source wiring WN. The transmission coil module 240 which is not electrically connected to the power source apparatus 20 via the first power source wiring WP and the second power source wiring WN, is electrically connected, via a third wiring W3 and a fourth wiring W4, to the transmission coil module 240 which is electrically connected to the power source apparatus 20 via the first power source wiring WP and the second power source wiring WN.

Also with the present embodiment, since the setting circuit 242 is provided separately from the power source apparatus 20, two power source wirings of the first power source wiring WP and the second power source wiring WN are used to supply power to the transmission coil L1. As described above, since the plurality of transmission coil modules 240 are arranged in a direction where the road RS extends, the lengths of the third wiring W3 and the fourth wiring W4 are shorter than the lengths of the first power source wiring WP and the second power source wiring WN. Hence, the third wiring W3 and the fourth wiring W4 of which the lengths are shorter than these of the first power source wiring WP and the second power source wiring WN are used to electrically connect adjacently-positioned transmission coil modules 240, whereby the power can be supplied to the plurality of transmission coils L1. Thus, a workload is reduced for installing the wireless power source apparatus 10.

Figure 5:
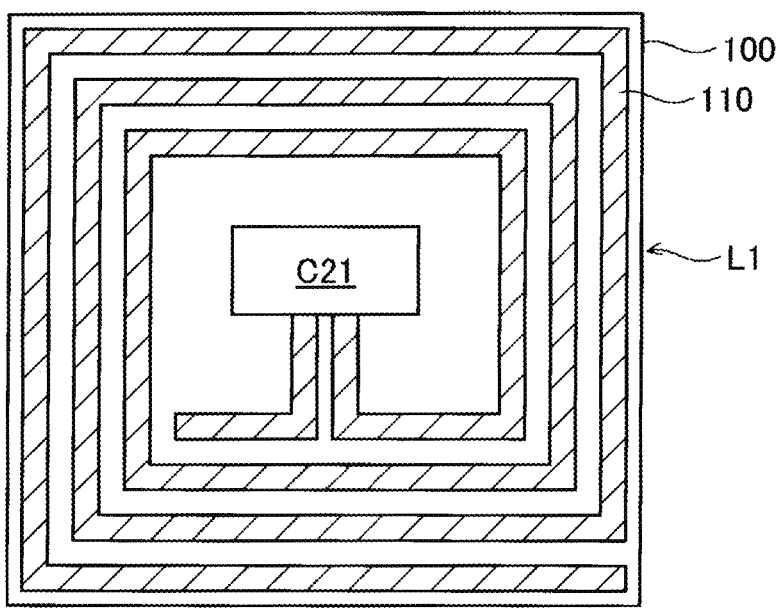
FIG. 5 is diagram showing a plan view of a substrate on which a transmission coil and a capacitor according to the second embodiment are arranged.

As shown in FIG. 5, according to the present embodiment, the transmission coil L1 and the variable capacitance capacitor C1 are arranged on the same printed circuit board 100. The transmission coil L1 is formed of a printed wiring 110 indicated by an oblique-line hatching, which is formed in a spiral shape on the printed circuit board 100. The variable capacitance capacitor C1 is mounted inside the transmission coil L1. Here, 'inside' refers to a region inside a space defined by a column or a prism where the height direction is the coil center axis direction and the bottom is an area surrounded by a lead wire that constitutes the transmission coil L1, and a region where magnetic flux produced by the transmission coil L1 passes therethrough. As the region where the magnetic flux produced the transmission coil L1 passes therethrough, for example, a region defined by the diameter or the width of the transmission coil L1 can be set. The transmission coil L1 and the variable capacitance capacitor C1 are arranged on the same printed circuit board 100. Hence, a printed wiring can be used for a connection between the transmission coil L1 and the variable capacitance capacitor C1. Thus, terminals or harnesses are not required for the connection between the transmission coil L1 and the capacitor C1. As a result, the transmission resonant circuit 244 can be accomplished with a simple configuration.

The variable capacitance capacitor C21 has characteristic in which the larger the magnetic flux density passing therethrough, the larger the capacitance value is. Then, the variable capacitance capacitor C21 has characteristics having a capacitance value at which the transmission resonant circuit 244 is in the resonant state at the operating frequency when the reception coil L2 opposes the transmission coil L1. Accordingly, the capacitance value of the variable capacitance capacitor C21 connected to the non-opposed transmission coil NL1 is smaller than the capacitance value of the variable capacitance capacitor C21 connected to the opposed transmission coil OL1, since the magnetic flux density produced by the transmission coil L1 is small. Thus, similar to the first embodiment, the impedance of the transmission circuit 241 having the non-opposed transmission coil NL1 is larger, thereby preventing the current from flowing easily. Hence, according to this configuration, the impedance of the transmission resonant circuit 244 can be changed without using the control circuit 50.

According to the above-described second embodiment, effects and advantages similar to those in the above-described embodiments can be obtained, and also the size of the transmission circuit 241 can be smaller since the setting circuit 242 is disposed inside the transmission coil L1. Further, the transmission coil L1 and the setting circuit 242 are arranged on the same substrate, whereby a printed wiring can be utilized for connecting the transmission coil L1 and the setting circuit 242.

C. Third Embodiment

Figure 6:
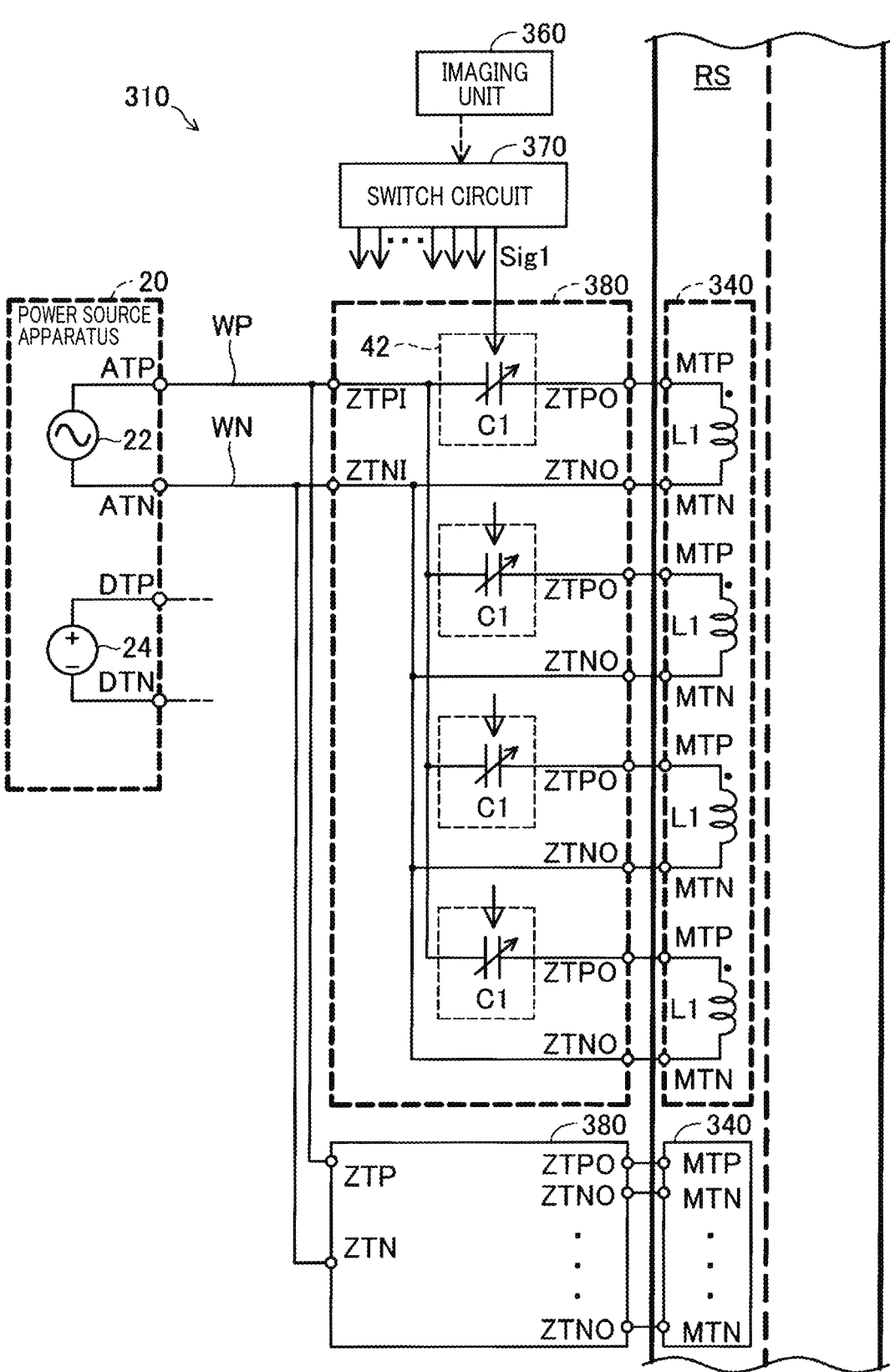
FIG. 6 is a diagram showing an arrangement of a circuit configuration of a wireless power supply apparatus according to a third embodiment.

As shown in FIG. 6, a wireless power supply apparatus 310 according to the third embodiment is provided with a power source apparatus 20, a transmission coil module 340, a setting circuit module 380, a switch circuit 370 and an imaging unit 360. The wireless power supply apparatus 310 according to the present embodiment differs from the first embodiment in that the setting circuit 42, which is included in the transmission coil module 40 according to the first embodiment, is provided separately from the transmission coil module 40 according to the third embodiment. Note that configurations same as those in the above-described embodiments are applied with the same reference symbols and the explanation thereof will be omitted.

The setting circuit module 380 is provided with a plurality of setting circuits 42, a first input terminal ZTPI, a second input terminal ZTNI, a plurality of first output terminal ZTPO and a plurality of second output terminals ZTNO. The plurality of setting circuits 42 are accommodated in a housing (not shown) of the setting circuit module 380. The respective terminals are provided being exposed from the housing. A variable capacitance capacitor C1 is disposed at each wiring connecting between the first input terminal ZTPI and the first output terminal ZTPO. The second input terminal ZTNI and respective second output terminals ZTNO are electrically connected by wirings in the housing.

The transmission coil module 340 is provided with a plurality of transmission coils L1, a plurality of first coil terminals MTP and a plurality of first coil terminals MTP. A transmission coil L1 is connected between the first coil terminal MTP and the first coil terminal MTN. The first output terminal ZTPO and the first coil terminal MTP are connected by a wiring, and the second output terminal ZTNO terminal and the second coil terminal MTN are connected by a wiring. Further, according to the present embodiment, for one AC power source 22, a plurality of setting circuit modules 380 and a plurality of transmission coil modules 340 are electrically connected. For the plurality of setting circuit modules 380, power source wirings are branched from the first power source wiring WP and the second power source wiring WN, thereby electrically connecting the AC power source 22 with the plurality of setting circuit modules 380.

The imaging unit 360 is provided with a camera that captures a vehicle 90 traveling on the road RS, and transmits the captured image to the switch circuit 370. The switch circuit 370 uses the transmitted image to identify the transmission coil L1 closely positioned to the vehicle 90, and transmits a switch signal Sig1 to respective variable capacitance capacitors C1 such that the transmission coil L1 closely positioned to the vehicle 90 is in a resonant state and other transmission coils L1 are in a non-resonant state.

According to the present embodiment, the setting circuit module 380 including the setting circuit 42 is provided separately from the transmission coil module 340 including the transmission coil L1, whereby the setting circuit 42 can be disposed separately from the transmission coil L1. Then, the transmission coil L1 is disposed on the road RS, and the setting circuit 42 is disposed at a portion different from the road RS. Since the vehicle travels on the road RS, when it is disposed on the road RS, external force is applied thereto due to the vehicle travelling on the road RS. Hence, an external force applied to the setting circuit 42 can be mitigated by disposing the setting circuit 42 at a portion different from the road RS, compared to a case where the setting circuit 42 is disposed on the road RS where the vehicle 90 travels. Therefore, degradation of the setting circuit 42 can be suppressed. The setting circuit 42 may preferably be disposed at a portion where less vehicles pass therethrough, for example, a sidewalk or a roadside of the traffic lane. Also, since the setting circuit 42 is not necessarily disposed at a portion opposing the reception coil L2, the setting circuit may be disposed on the ground other than embedding under the ground. In the case where the setting circuit 42 is disposed on the ground, a maintenance operation for the setting circuit 42 can be simplified.

According to the above-described third embodiment, effects and advantages similar to those in the above-described embodiments can be obtained. Further, since the transmission coil L1 is disposed on the road RS and the setting circuit 42 are disposed at a portion different from the road RS, wireless power supply operation can be accomplished for the vehicle 90 travelling on the road RS and also degradation of the setting circuit 42 can be suppressed.

D. Fourth Embodiment

Figure 7:
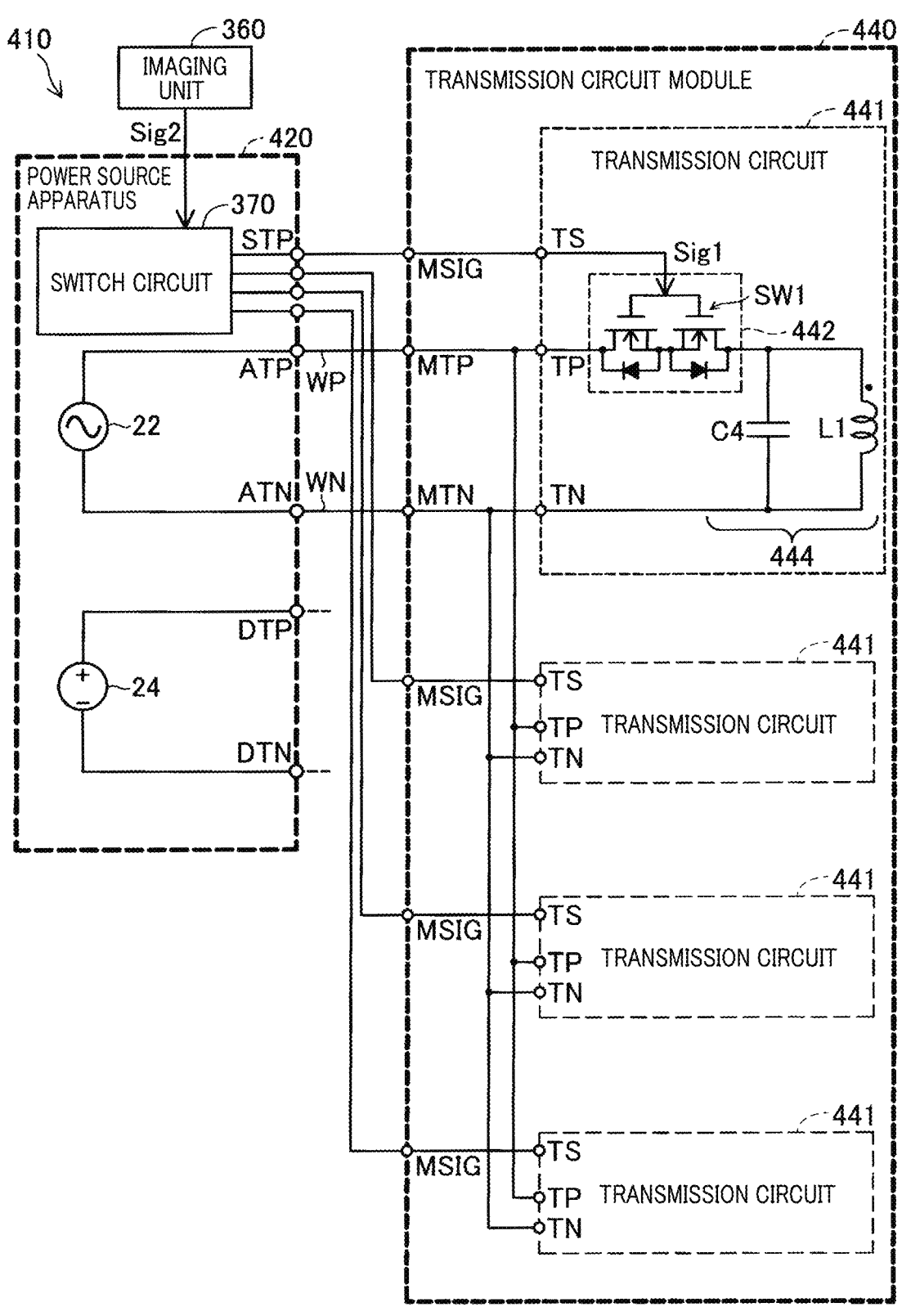
FIG. 7 is a diagram showing a circuit configuration of a wireless power supply apparatus according to a fourth embodiment.

As shown in FIG. 7, a wireless power supply apparatus 410 according to the third embodiment is, similar to the third embodiment, provided with a imaging unit 360 and a switch circuit 370, and a switch signal Sig1 from the switch circuit 370 is transmitted to respective setting circuit 442. The transmission circuit 441 according to the fourth embodiment differs from the first embodiment in that the circuit configuration of the transmission circuit 41 is different from that of the first embodiment. Note that configurations same as those in the above-described embodiments are applied with the same reference symbols and the explanation thereof will be omitted.

The transmission circuit 441 is provided with a transmission coil L1, a fourth capacitor C4, a setting circuit 442, a first transmission circuit terminal TP, a second transmission circuit terminal TN and a third transmission circuit terminal TS. The transmission coil L1 and the fourth capacitor C4 are connected in parallel to the first transmission terminal TP and the second transmission circuit terminal TN. The transmission coil L1 and the fourth capacitor C4 constitute a transmission resonant circuit 44 as a parallel resonant circuit. According to the present embodiment, the fourth capacitance C4 is connected in parallel to the transmission coil L1. Hence, since the resonant system that contributes the power factor is closed with the fourth capacitance C4 and the transmission coil L1, degradation of the power factor of the AC power outputted from the AC power source 22 due to parasitic inductance of the wirings can be suppressed.

The setting circuit 442 is configured of a second circuit including a first switch SW1 as a second circuit switch. The first switch SW1 is disposed at a wiring connecting the first transmission circuit terminal TP and the transmission coil L1. The first switch SW1 changes a connection state between the first transmission circuit terminal TP and the transmission coil L1 to be a conduction state or a non-conduction state depending on the voltage value of the switch signal Sig1. According to the present embodiment, the first switch SW1 is configured of two series-connected N-channel MOS-FETs such that respective source terminals are connected. The switch signal Sig1 is inputted to the gate terminals of the two MOS-FETs. When a high-level switch signal Sig1 is inputted to the first switch SW1, the first switch SW1 is in a conduction state as a first state causing the first transmission circuit terminal TP and the transmission coil L1 to be in a conduction state. Thus, the transmission coil L1 is set to be in a power feeding state. On the other hand, when a low-level switch signal Sig1 is inputted to the first switch SW1, the first switch SW1 is in a non-conduction state as a second state causing the first transmission circuit terminal TP and the transmission coil L1 to be in a non-conduction state. Thus, the transmission coil L1 is set to be in a standby state. Note that the first state SW1 is not limited to the above-described configuration. For example, the first switch SW1 may be configured to have another diode of which the direction is the same as that of the body-diode of the MOS-FET shown in FIG. 7

The switch circuit 370 transmits a high-level signal Sig1 to the transmission circuit 441 including the transmission coil L1 opposing the reception coil L2 and transmits a low-level signal Sig 1 to the transmission circuit 441 including the transmission coil L1 not opposing the reception coil L2. Thus, the AC power is supplied to the transmission coil L1 opposing the reception coil L2, and the transmission resonant circuit 444 is in the resonant state. On the other hand, the AC power is not supplied to the transmission coil L1 not opposing the reception coil L2. Thus, power is supplied to the reception apparatus 92 from the transmission coil L1 opposing the reception coils L2 as a wireless power supply operation.

According to the present embodiment, the switch circuit 370 is included in the power source apparatus 420. Specifically, the switch circuit 370 is accommodated in the power source housing 20a. For the power source housing 20a (FIG. 1), a plurality of signal output terminals STP are provided. For the transmission circuit module 440, a plurality of coil signal terminals MSIG are provided. The signal output terminals STP and the coil signal terminals MSIG are connected by signal wirings. Further, the transmission circuit module 440 includes a plurality of transmission circuits 441. Similar to the first embodiment, the first transmission circuit terminal TP and the second transmission circuit terminal TN in the respective transmission circuits 441 are connected to the first coil terminal MTP and the second coil terminal MTN respectively in the transmission circuit module 440. The third transmission circuit terminal TS in the respective transmission circuits 441 is connected to corresponding coil signal terminal MSIG in the transmission circuit module 440. The switch circuit 370 is provided in the power source apparatus 420. Hence, the switch circuit 370 and the power source apparatus 420 can be treated as an integrated body, whereby workload is reduced for installing the wireless power source apparatus 10.

According to the above-described fourth embodiment, effects and advantages similar to those in the above-described embodiments can be obtained. Further, the switch circuit 370 is provided in the power source apparatus 420, whereby a workload is reduced for installing the wireless power source apparatus 10.

E. Fifth Embodiment

Figure 8:
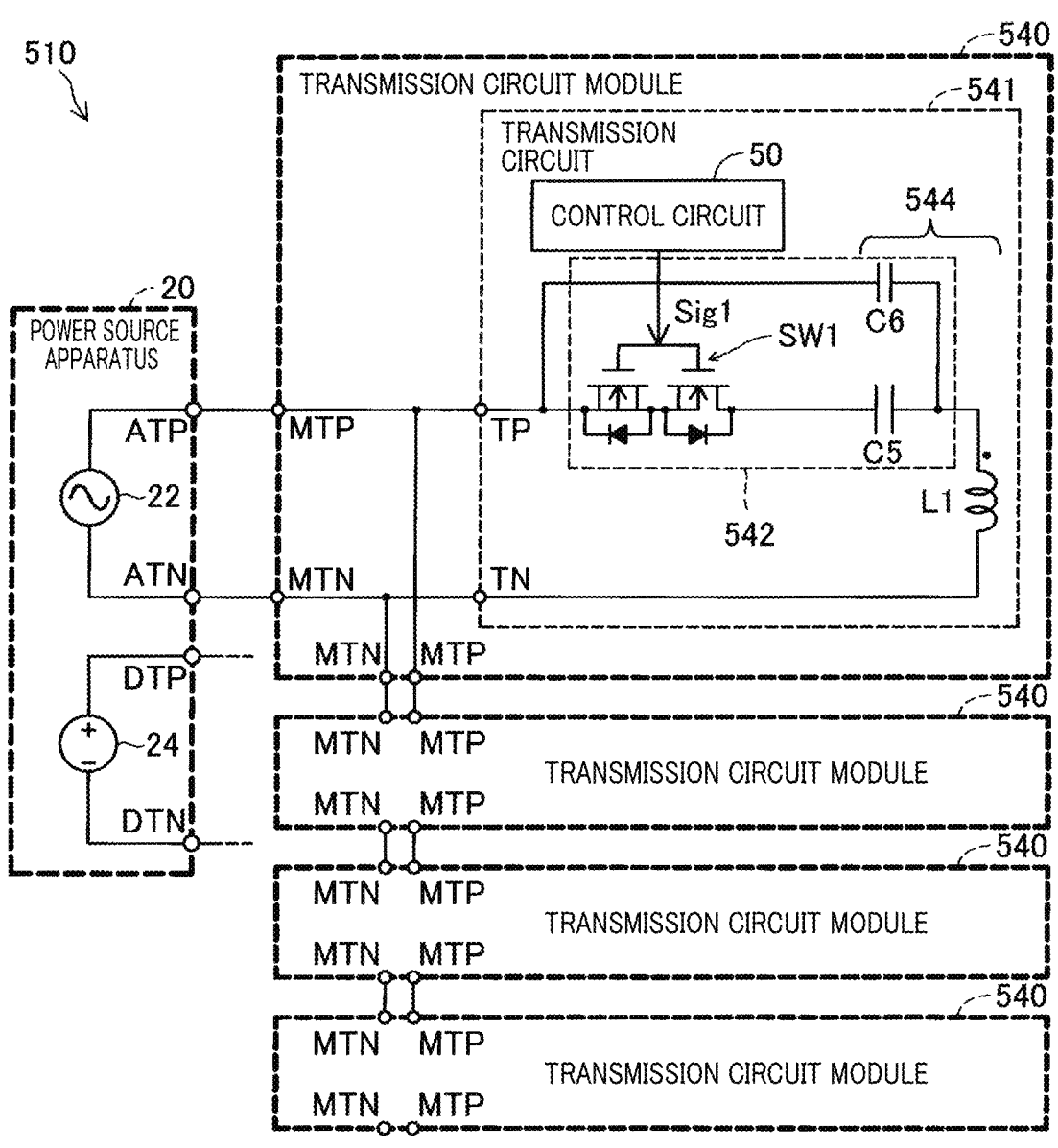
FIG. 8 is a diagram showing a circuit configuration of a wireless power supply apparatus according to a fifth embodiment.

As shown in FIG. 8, a wireless power supply apparatus 510 according to the fifth embodiment differs from the wireless power supply apparatus 10 according to the first embodiment in that the circuit configuration of the transmission circuit 541 is different from that of the first embodiment. Note that configurations same as those in the first embodiment are applied with the same reference symbols and the explanation thereof will be omitted.

The transmission circuit 541 is provided with a transmission coil L1, a setting circuit 542, a control circuit 50, a first transmission circuit terminal TP and a second transmission circuit terminal TN. The setting circuit 542 is configured as a third circuit including a first switch SW1 as a third circuit switch, a fifth capacitor C5 and a sixth capacitor C6. The first switch SW1, the fifth capacitor C5 and the transmission coil L1 are connected in series in this order between the first transmission circuit terminal TP and the second transmission circuit terminal TN. The sixth capacitor C6 is connected in parallel to a connection circuit of the first switch SW1 and the fifth capacitor C5. The capacitance value of the sixth capacitance C6 is smaller than that of the fifth capacitor C5. The switch signal Sig1 is transmitted to the first switch SW1 from the control circuit 50.

The first switch SW1 changes the state of the fifth capacitor C5 as a part of capacitances fifth capacitor C5 and the sixth capacitor C6 having mutually different capacitance values, to be either a conduction state or a non-conduction state. Specifically, when the high-level switch signal Sig1 is inputted to the first switch SW1, the state of the first switch is in a conduction state where current flows to the fifth capacitor C5. Here, the composite capacitance of the fifth capacitor C5 and the sixth capacitor C6 and the inductance of the transmission coil L1 are set to cause a resonant state at the operating frequency. Thus, the first switch SW1, when being in the conduction state, the fifth capacitor C5, the sixth capacitor C6 and the transmission coil L1 constitute a transmission resonant circuit 544 as a series resonant circuit. In contrast, when a low-level switch signal Sig1 is inputted to the first switch SW1, the first switch SW1 is in a non-conduction state, and the fifth capacitor C5 is in a non-conduction state. Since the resonant frequency of the resonant circuit formed of the sixth capacitor C6 and the transmission coil L1 in a conduction state is deviated from the operating frequency, the transmission coil L1 is in a standby state. Further, since the capacitance of the sixth capacitance C6 is smaller than the capacitance of the fifth capacitor C5, when the first switch SW1 is in a non-conduction state, an impedance of the transmission circuit 541 becomes larger for the AC power inputted thereto. Hence, the current flowing through the transmission resonant circuit 544 is suppressed.

According to the above-described embodiment, effects and advantages similar to those in the above-described embodiments can be obtained, and also the transmission coil L1 can be set to be in either a power feeding state or a standby state by using the fifth capacitor C5 and the sixth capacitor C6 having mutually different capacitances and the setting circuit 543 having the first switch SW1.

F. Sixth Embodiment

Figure 9:
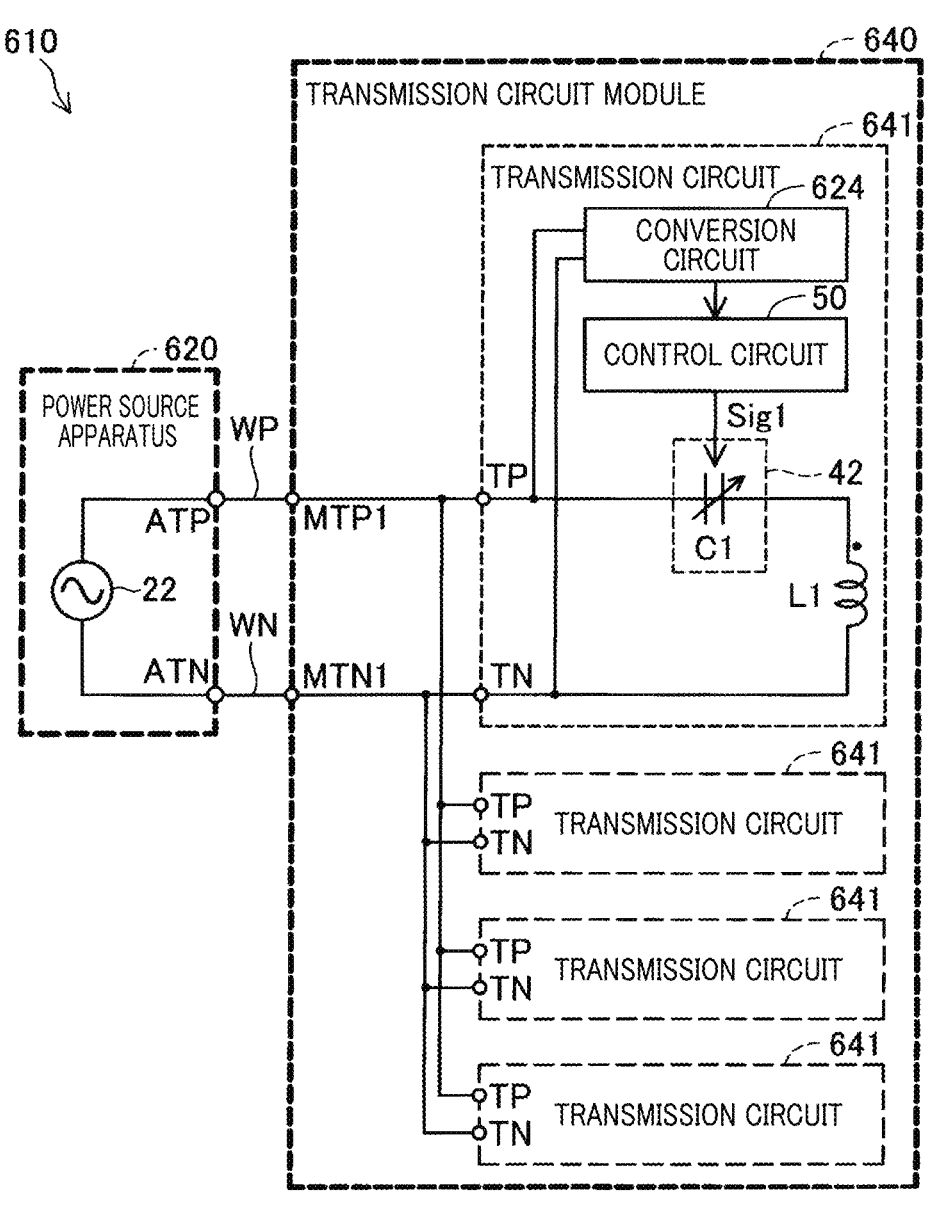
FIG. 9 is a diagram showing a circuit configuration of a wireless power supply apparatus according to a sixth embodiment.

As shown in FIG. 9, a wireless power supply apparatus 610 according to the sixth embodiment differs from the first embodiment in that the configurations of the power source apparatus 620 and the transmission circuit 641 are different from those in the first embodiment. Note that configurations same as those in the above-described embodiments are applied with the same reference symbols and the explanation thereof will be omitted.

The power source apparatus 620 according to the present embodiment includes an AC power source 22 but does not include the DC power source 24 according to the first embodiment. Then, the transmission circuit 641 is configured to include a conversion circuit 624 that converts the AC power into the DC power and supplies the DC power to the control circuit 50. The conversion circuit 624 may be configured of, for example, an AC/DC converter. Thus, compared to a configuration in which a DC power source 24 is disposed on the power source apparatus 20, and the DC power source 24 and the transmission coil module 40 are connected by a power source wiring, since the DC power can be supplied to the control circuit 50 without installing the power source wiring for supplying the DC power, a workload is reduced for installing the wireless power source apparatus.

According to the sixth embodiment as described above, effects and advantages similar to those in the above-described embodiments can be obtained, and also the DC power can be supplied to the control circuit 50 without installing the power source wiring for supplying the DC power, a workload is reduced for installing the wireless power source apparatus.

G. Seventh Embodiment

Figure 10:
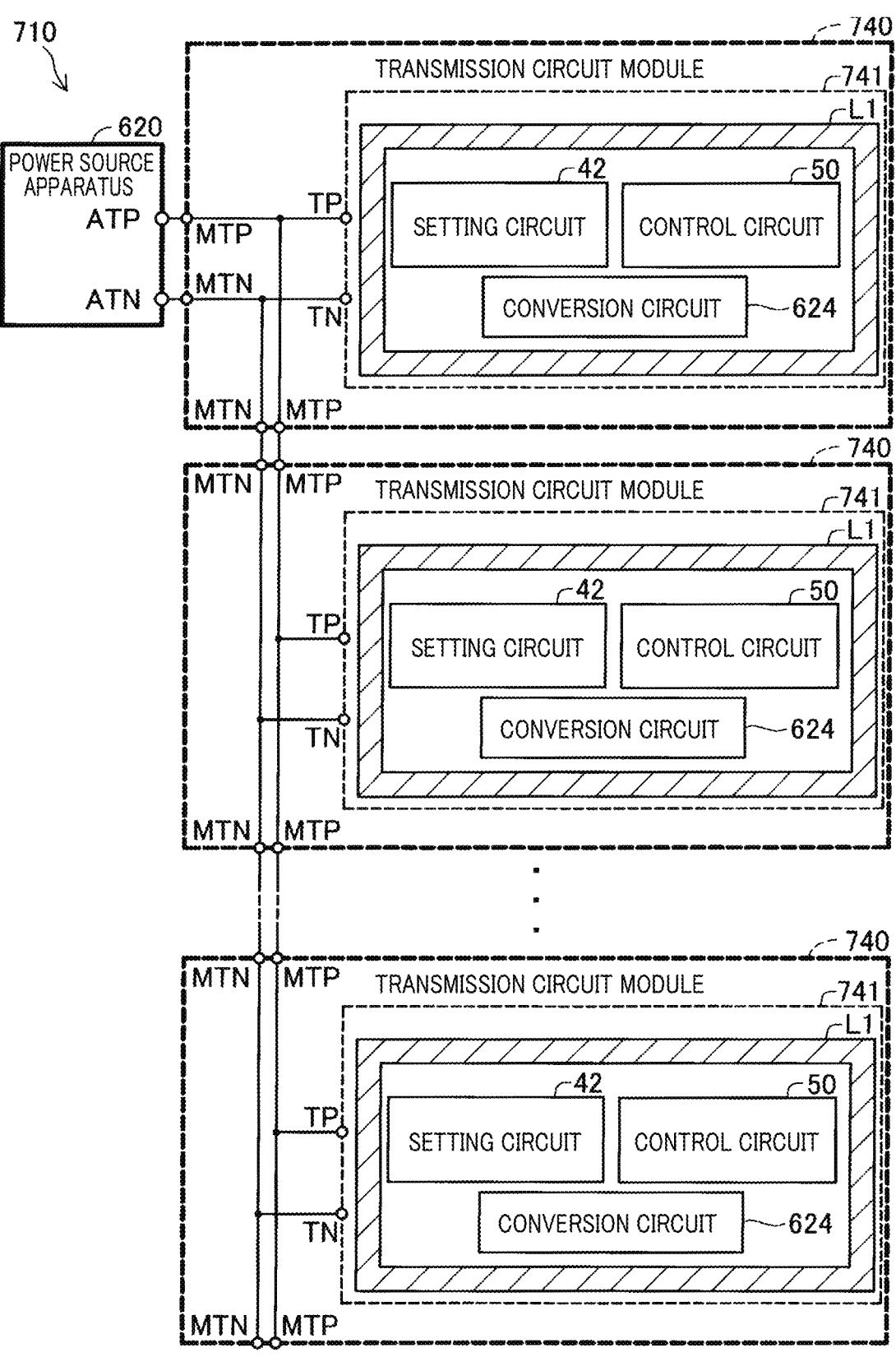
FIG. 10 is a diagram showing an arrangement of a circuit configuration of a wireless power supply apparatus according to a seventh embodiment.

As shown in FIG. 10, a wireless power supply apparatus 710 according to the seventh embodiment includes a circuit configuration similar to that of the sixth embodiment. The seventh embodiment differs from the sixth embodiment in that the transmission coil module 640 according to the sixth embodiment includes a plurality of transmission circuits 641, but a transmission coil module 740 according to the seventh embodiment has one transmission circuit 741.

Note that configurations same as those in the above-described embodiments are applied with the same reference symbols and the explanation thereof will be omitted.

The transmission circuit 741 includes a transmission coil L1, a setting circuit 42, a control circuit 50 and a conversion circuit 624. Similar to the second embodiment, a setting circuit 42, a control circuit 50 and a conversion circuit 624 are arranged inside the transmission coil L1. In FIG. 10, the transmission coil L1 is indicated by an oblique-line hatching. As shown by an outline of the transmission coil L1 indicated by the oblique-line hatching, respective circuits are arranged inside a spiral-shaped conductor that constitutes the transmission coil L1. The respective circuits are arranged inside the transmission coil L1, whereby the size of the transmission circuit 741 can be smaller.

H. Other Embodiments (H1) According to the respective embodiments, the power reception apparatus 92 is mounted on a vehicle 90 such as an electric vehicle. The vehicle to which the power reception apparatus 92 is mounted may be an AGV (i.e. automated guided vehicle). In the case where the power reception apparatus 92 is mounted on the AGV and the setting circuit 42 is provided separately from the transmission coil L1 similar to the third embodiment, the setting circuit 42 may be installed at a portion different from a passage, for example, a portion where the AGV does not travel such as a portion below a storage shelf.

(H2) According to the above-described first embodiment, the detection coil L3 detects a magnetic flux produced by the transmission coil L1 as a physical quantity where the value changes depending on the distance between the transmission coil L1 and the reception coil L2. The physical quantity where the value changes depending on the distance between the transmission coil L1 and the reception coil L2, may be not only the magnetic flux but also a voltage of the transmission coil L1, a current of the transmission coil L1, a voltage of the resonant capacitor, and a magnetic field or an electric field in the vicinity of the transmission coil L1. In this configuration, the detection circuit 60 may be configured having a detector for detecting respective physical quantities.

Figure 11:
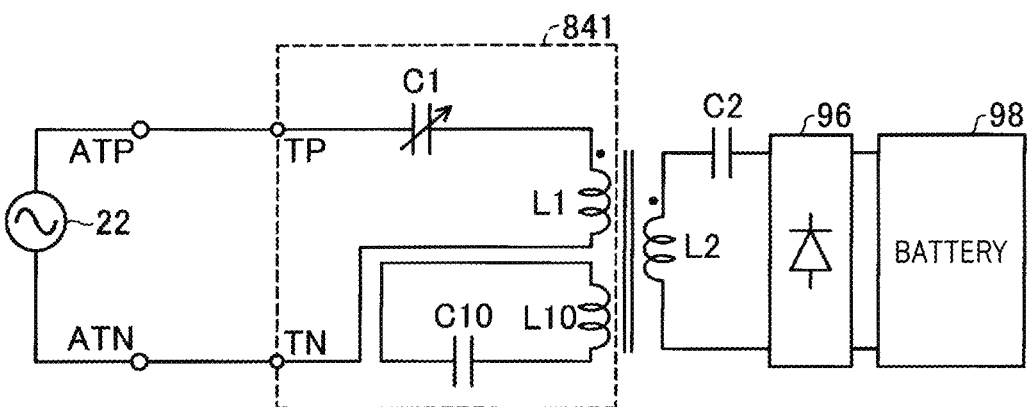
FIG. 11 is a circuit configuration of a transmission circuit according to a first form of another embodiment.
Figure 12:
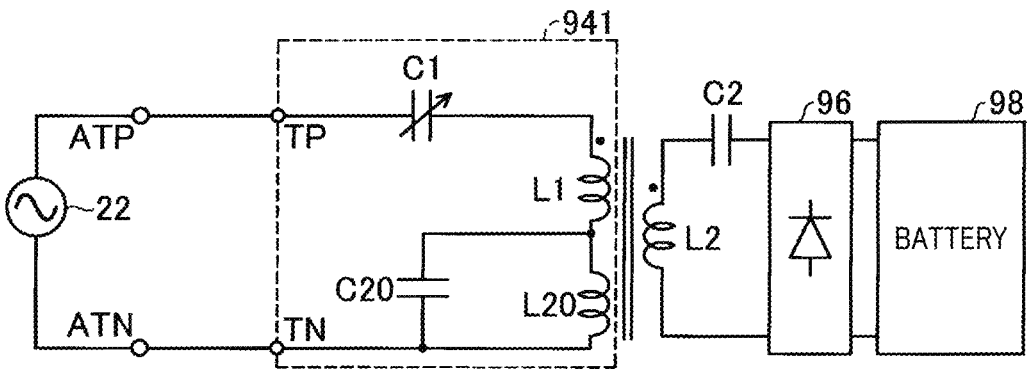
FIG. 12 is a circuit configuration of a transmission circuit according to a second form of another embodiment.

(H3) According to the above-described first embodiment, the transmission circuit 41 includes a variable capacitance C1 and a transmission coil L1. The circuit configuration of the transmission circuit 41 is not limited to the above-described embodiments. For example, as shown in FIG. 11, the transmission circuit 841 may be configured to include, in addition to the variable capacitance capacitor C1 and the transmission coil L1, a closed circuit in which a tertiary coil L10 and a capacitor C10 are connected in series. The closed circuit may be disposed at a portion in the vicinity of the transmission coil L1 such that the tertiary coil L10 is capable of being magnetically coupled with the reception coil L2 and the transmission coil L1. The capacitance values of the variable capacitance capacitor C1, the reception capacitor C2 and the capacitor C10 are set so as to decrease an imaginary component of the input impedance of the transmission circuit 841, whereby a decrease in the power factor of the AC power outputted from the AC power source 22 can be avoided. Further, as shown in FIG. 12, the transmission circuit 941 may be configured to include a circuit in which a tertiary coil L20 series-connected to the transmission coil L1 and a capacitor C20 connected in parallel to the tertiary coil L20, in addition to the variable capacitance capacitor C1 and the transmission coil L1. The circuit in which a tertiary coil L20 series-connected to the transmission coil L1 and a capacitor C20 connected in parallel to the tertiary coil L20 is disposed at a portion where the tertiary coil L20, the reception coil L2 and the transmission coil L1 are capable of being magnetically coupled with each other, between the transmission coil L1 and the second transmission circuit terminal TN. Even with this circuit configuration, similar to the above, the capacitance values of the variable capacitance capacitor C1, the reception capacitor C2 and the capacitor C20 are set so as to decrease an imaginary component of the input impedance of the transmission circuit 941, whereby a decrease in the power factor of the AC power outputted from the AC power source 22 can be avoided.

(H4) According to the above-described first embodiment, the detection coil L3 is arranged to be capable of being magnetically coupled with the transmission coil L1. In the case where the transmission circuit 41 is configured to include coils other than the transmission coil L1, capable of being magnetically coupled with the transmission coil L1, a detection coil L3 may be provided capable of being magnetically coupled with the above coils other than the transmission coil L1.

(H5) According to the above-described first embodiment, the switch circuit 70 utilizes a detection signal Sig2 outputted from the detection circuit 60 and outputs the switch signal Sig1. Other than this example, a configuration may be employed in which a detection signal Sig2 outputted from the detection circuit 60 and other external signal are used to output the switch signal Sig1. Note that other external signal refers to a signal for changing the state of the transmission coil L1 to be either a power-feeding state or a standby state when detecting an abnormal state regardless of the position of the transmission coil L1.

(H6) According to the above-described first embodiment, a plurality of transmission coils L1 are connected in parallel to the AC power source 22. The wireless power supply apparatus may be configured to include one transmission coil L1. According to this configuration, when another transmission coil L1 is additionally provided being connected in parallel to the AC power source 22, since a power source wiring for supplying power to another transmission coil L1 from the first power source wiring WP and the second power source wiring can be branched, workload can be reduced for installing the wireless power source apparatus.

The present disclosure is not limited to the above-described embodiments and modification examples and various configurations may be utilized without departing from the spirit of the present disclosure. For example, embodiments corresponding to technical features in examples described in the summary section, technical features in the modification examples may be appropriately replaced or combined in order to solve a part or all of issues in the above-described problems to be solved, or in order to accomplish a part or all of the above-described effects and advantages. Further, unless the above-described technical features are described as necessary in the present specification, the technical features may be appropriately removed.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

I. Other Embodiments (1) According to a first aspect, a wireless power supply apparatus that supplies power to a reception apparatus in a wireless manner is provided. The wireless power supply apparatus is provided with a power source apparatus that outputs an AC power, a transmission coil electrically connected to the power source apparatus, and a setting circuit interposed between the power source apparatus and the transmission coil, setting the transmission coil to be in either a power feeding state or a standby state, wherein the setting circuit is provided separately from the power source apparatus.

(2) According to a second aspect, the wireless power supply apparatus according to the first aspect is modified in which a transmission coil module including one or more transmission coils is further provided, and the transmission coil module includes an external connection terminal for electrically connecting with the power source apparatus, a wiring that electrically connects between the external connection terminal and the transmission coil and the setting circuit connected to the wiring.

(3) According to a third aspect, the wireless power supply apparatus according to the second aspect is modified in which the setting circuit is disposed inside the transmission coil.

(4) According to a fourth aspect, the wireless power supply apparatus according to the third aspect is modified in which the transmission coil and the setting circuit are arranged on the same substrate.

(5) According to a fifth aspect, the wireless power supply apparatus according to the first aspect is modified in which the transmission coil is disposed on a passage where a vehicle travels and the setting circuit is disposed at a portion different from the passage.

(6) According to a sixth aspect, the wireless power supply apparatus according to any one of the first to fifth aspects is modified in which the setting circuit is configured of any one of a first circuit, a second circuit and a third circuit; the first circuit includes a variable capacitance capacitor and is configured such that a capacitance of the variable capacitance capacitor is set to be a first capacitance, thereby setting the power feeding state, and a capacitance of the variable capacitance capacitor is set to be a second capacitance, thereby setting the standby state; the second circuit includes a second circuit switch that switches between a conduction state where the AC power is supplied to the transmission coil and a non-conduction state where the AC power is not supplied to the transmission coil, the second switch is caused to be in the conduction state, thereby setting the power-feeding state and the second switch is caused to be in the non-conduction state, thereby setting the standby state; the third circuit includes a plurality of capacitors having mutually different capacitances and a third circuit switch that switches some of the plurality of capacitors to be in either a conduction state or a non-conduction state, the third circuit switch is caused to be in either one of the conduction state or the non-conduction state, thereby setting the power feeding state, and the third circuit switch is caused to be in the other state, thereby setting the standby state.

(7) According to a seventh aspect, the wireless power supply apparatus according to any one of the first to fourth aspects is modified in which a plurality of the transmission coils are provided; and the plurality of transmission coils are connected in parallel to the power source apparatus.

(8) According to a eighth aspect, the wireless power supply apparatus according to any one of the first to seventh aspects is modified in which the setting circuit is configured to be capable of switching a state between a first state and a second state, and configured to set the power feeding state in the first state and set the standby state in the second state; the wireless power supply apparatus further comprises a switch circuit outputting a switch signal to the setting circuit to switch the state between the first state and the second state; and the switch circuit is disposed in the power source apparatus.

(9) According to a ninth aspect, the wireless power supply apparatus according to any one of the first to seventh aspects is modified in which the setting circuit is configured to be capable of switching a state between a first state and a second state, and configured to set the power feeding state in the first state and set the standby state in the second state; the wireless power supply apparatus further comprises a detection circuit and a switch circuit; the detection circuit detects a physical quantity which varies depending on a distance between the transmission coil and the reception coil, and outputs a detection signal to the switch circuit; the switch circuit outputs, using the detection signal, a switch signal to the setting circuit to switch the state between the first state and the second state; and the detection circuit and the switch circuit are arranged in the transmission coil module.

(10) According to a tenth aspect, the wireless power supply apparatus according to the ninth aspect further comprises a conversion circuit that converts the AC power to a DC power and supplies the DC power to either one of the detection circuit or the switch circuit, wherein the conversion circuit is disposed in the transmission coil module.

CONCLUSION

According to one aspect of the present disclosure, a wireless power supply apparatus (10, 210-710) that supplies power to a reception apparatus (92) in a wireless manner is provided.

The wireless power supply apparatus is provided with a power source apparatus that outputs an AC power; a transmission coil electrically connected to the power source apparatus; and a setting circuit interposed between the power source apparatus and the transmission coil, setting the transmission coil to be in either a power feeding state or a standby state, wherein the setting circuit is provided separately from the power source apparatus.

According to the wireless power supply apparatus of the one aspect, since the setting circuit is provided separately from the power source apparatus, when another transmission coil is additionally provided being connected in parallel to the AC power source, in the wiring connecting between the power source apparatus and the transmission coil, a wiring connecting from any position between the power source apparatus and the setting circuit to another transmission coil can be branched. Hence, a workload can be reduced for installing the wireless power source apparatus.

What is claimed is:

1. A wireless power supply apparatus that supplies power to a reception apparatus in a wireless manner, the wireless power supply apparatus comprising:
   a power source apparatus that outputs an AC power;
   a transmission coil module including a transmission coil electrically connected to the power source apparatus; and
   a setting circuit interposed between the power source apparatus and the transmission coil, the setting circuit configured to set the transmission coil to be in either a power feeding state or a standby state,
   wherein
   the setting circuit is provided separately from the power source apparatus;
   the transmission coil module further comprises:
      an external connection terminal for electrically connecting with the power source apparatus,
      a wiring that electrically connects between the external connection terminal and the transmission coil, and
      the setting circuit connected to the wiring;
   the setting circuit is configured to be capable of switching a state between a first state and a second state, and configured to set the power feeding state in the first state and set the standby state in the second state;
   the wireless power supply apparatus further comprises a detection circuit and a switch circuit;
   the detection circuit detects a physical quantity which varies depending on a distance between the transmission coil and a reception coil of the reception apparatus, and outputs a detection signal to the switch circuit;
   the switch circuit outputs, using the detection signal, a switch signal to the setting circuit to switch the state between the first state and the second state; and
   the detection circuit and the switch circuit are arranged in the transmission coil module.

2. The wireless power supply apparatus according to claim 1,
   wherein
   the setting circuit is disposed inside the transmission coil.

3. The wireless power supply apparatus according to claim 2,
   wherein
   the transmission coil and the setting circuit are arranged on a same substrate.

4. The wireless power supply apparatus according to claim 1,
   wherein
   the transmission coil is disposed on a passage where a vehicle travels; and
   the setting circuit is disposed at a portion different from the passage.

5. The wireless power supply apparatus according to claim 1,
   wherein
   the setting circuit is configured of any one of a first circuit, a second circuit and a third circuit;
   the first circuit includes a variable capacitance capacitor and is configured such that a capacitance of the variable capacitance capacitor is set to be a first capacitance, thereby setting the power feeding state, and a capacitance of the variable capacitance capacitor is set to be a second capacitance, thereby setting the standby state;
   the second circuit includes a second circuit switch that switches between a conduction state where the AC power is supplied to the transmission coil and a non-conduction state where the AC power is not supplied to the transmission coil, the second switch is caused to be in the conduction state, thereby setting the power-feeding state and the second switch is caused to be in the non-conduction state, thereby setting the standby state;

the third circuit includes a plurality of capacitors having mutually different capacitances and a third circuit switch that switches some of the plurality of capacitors to be in either a conduction state or a non-conduction state, the third circuit switch is caused to be in either one of the conduction state or the non-conduction state, thereby setting the power feeding state, and the third circuit switch is caused to be in the other state, thereby setting the standby state.

6. The wireless power supply apparatus according to claim 1, wherein a plurality of the transmission coils are provided; and the plurality of transmission coils are connected in parallel to the power source apparatus.

7. The wireless power supply apparatus according to claim 1, further comprising a conversion circuit that converts the AC power to a DC power and supplies the DC power to either one of the detection circuit or the switch circuit, wherein the conversion circuit is disposed in the transmission coil module.

* * * * *